United States Patent [19]
Bollhagen et al.

[11] Patent Number: 5,141,317
[45] Date of Patent: Aug. 25, 1992

[54] METHOD OF OPTOELECTRONICALLY MEASURING DISTANCES AND ANGLES

[75] Inventors: Heins-Erdam Bollhagen, Leonberg; Pawel Drabarek, Ditzingen, both of Fed. Rep. of Germany

[73] Assignee: Robert Bosch GmbH, Stuttgart, Fed. Rep. of Germany

[21] Appl. No.: 623,920
[22] PCT Filed: Jun. 22, 1988
[86] PCT No.: PCT/DE89/00409
  § 371 Date: Dec. 24, 1990
  § 102(e) Date: Dec. 24, 1990
[87] PCT Pub. No.: WO89/12799
  PCT Pub. Date: Dec. 28, 1989

[30] Foreign Application Priority Data
  Jun. 22, 1988 [DE] Fed. Rep. of Germany ....... 3821046

[51] Int. Cl.⁵ ................................. G01B 9/02
[52] U.S. Cl. ..................... 356/356; 356/349; 356/363
[58] Field of Search ........ 356/349, 356, 363; 250/231.14, 231.16, 237 G

[56] References Cited
U.S. PATENT DOCUMENTS
| | | | |
|---|---|---|---|
| 3,891,321 | 6/1975 | Hock | 356/356 |
| 4,710,026 | 12/1987 | Magome et al. | 356/356 |
| 4,940,330 | 7/1990 | Dopheide et al. | 356/349 |
| 5,000,573 | 3/1991 | Suzuki et al. | 356/349 |

FOREIGN PATENT DOCUMENTS
0248277 12/1987 European Pat. Off.
2615281 3/1988 France.

OTHER PUBLICATIONS
Paper of R. C. Quenelle et al entitled "A New Microcomputer-Controlled Laser Dimenstional Measurement and Analysis System", Hewlett-Packard Journal, No. 3, pp. 3 to 13, Apr. 1983.
"Follow-Up-Type Laser Doppler Velocimeter Using Single-Mode Optical Fibers"; Sasaki et al, Applied Optics, Apr. 1990, pp. 1306-1308.

*Primary Examiner*—Samuel A. Turner
*Attorney, Agent, or Firm*—Walter Ottesen

[57] ABSTRACT

A method for optoelectronically measuring distances and/or angles is suggested. A first and second beam (13, 14 and 61, 63) are directed onto the surface 12 of an object 10 to be measured at pregiven angles ($\alpha$ and $\beta$) which are diffracted at a common point of incidence on the surface 12. In one embodiment, the two beams (13, 14 and 61, 63) have different frequencies. In another embodiment, the frequency of the two beams (13, 14 and 61, 63) changes simultaneously and one of the two beams (13, 61; 14, 63) has a phase modulation. The phase change of the signal supplied by the sensor 18 is evaluated with reference to a reference signal.

13 Claims, 2 Drawing Sheets

METHOD OF OPTOELECTRONICALLY MEASURING DISTANCES AND ANGLES

FIELD OF THE INVENTION

The invention relates to a method for optoelectronically making distance and angle measurements wherein a beam is directed at a pregiven incident angle onto an object to be measured.

BACKGROUND OF THE INVENTION

An electrooptical precision distance and angle measuring arrangement is known from the corporate paper "Hewlett-Packard Journal", No. 3, Apr. 1983. In this arrangement, the distance information is obtained via the Doppler effect. A laser is provided which supplies two optical beams having different frequencies and different polarizations. The superposed beams reach a first optical receiver as well as a beam splitter which deflects one of the two beams and transmits the other beam. The beam deflected by the beam splitter impinges on two deflecting mirrors and returns to the beam splitter. This beam traverses a predetermined optical path. The beam transmitted by the beam splitter having the other frequency likewise impinges on two deflecting mirrors and is returned to that particular location in the beam splitter at which the deflected returned beam impinges. The return beams are superposed in the beam splitter and are incident upon a second optical receiver.

The two deflecting mirrors in the beam path of the beam transmitted by the beam splitter are movably mounted. With a movement, the optical distance traversed by the transmitted beam is increased or decreased. The movement leads to an increase or reduction of the frequency of the reflected beam (Doppler effect).

The first optical receiver supplies an output signal having a frequency proportional to the frequency difference of the two beams generated by the laser. The second optical receiver supplies an output signal having a frequency proportional to the frequency difference of the two beams generated by the laser and is reduced or increased by the Doppler frequency. The two output signals are applied to a frequency counter which determines the difference of the two signals with the result being the Doppler frequency which is a measure of the velocity of the moving deflecting mirrors. The traversed path or angle is determined from the velocity.

SUMMARY OF THE INVENTION

According to the method of the invention for optoelectronically measuring distances and angles, a first beam and a second beam are directed onto the object at pregiven incident angles with the second beam having a phase modulation compared to the first beam. At least one component of each of the two beams impinges upon the same point of incidence on the object. At the point of incidence of the two beams, a diffraction and an interference take place because the surface of the object always has a roughness which has the effect of an optical diffraction grating.

The diffracted beam components interfere and are applied to a first optical sensor. A phase change of the sensor output signal with reference to the phase of a reference signal is evaluated as a measure for the distance traversed by the object being measured or the angle traversed by the object being measured. With these steps, in combination with a constant distance between the object being measured and the measuring arrangement, the influence of environmental conditions such as air pressure, humidity and temperature on the measuring result is reduced. Further advantages are the high resolution of the measuring result as well as the stability of the inertia-free and contact-free measuring method.

A further reduction of the environmental influences is obtained if the angle of incidence of the first beam directed onto the object is determined as being equal to the negative angle of incidence of the second optical beam likewise directed onto the object being measured and if the first optical sensor is aligned in the vertical direction to the surface of the object being measured with the angles of incidence of the two beams lying on opposite sides of the vertical. With this measure, both beams traverse optical distances of the same length and environmental influences have the same effect in both beam paths.

In a first embodiment of the method of the invention, the reference signal is derived from the two beams in that a component of the two beams directed to the object being measured is coupled out and directed to a further beam sensor having an output signal which functions as a reference signal. In an advantageous configuration of the first embodiment of the invention, the two out-coupled beams are directed onto a ground glass screen and the beams diffracted by this screen impinge upon a further sensor. In this way, an adaptation of the intensities of two beams impinging on the further sensor are adapted to the intensities of the two beams impinging on the first sensor so that the further signal processing is simplified. With an adaptation of the optical paths in the reference signal branch compared to the measurement signal branch, a further increase of the symmetry of the arrangement is obtained and a further reduction of environmental influences on the measuring result occurs.

In a second embodiment of the method of the invention, the two optical beams are directed onto the surface of a reference object and the beams diffracted at the point of incidence are detected by at least one further beam sensor with the two beams directed onto the object to be measured and the beams directed onto the reference object as well as the beams diffracted at the measured object and the beams diffracted at the reference object traversing the same optical path up to impingement upon the two sensors. The second embodiment affords the advantage of a completely symmetrical arrangement of the measuring signal branch and of the reference signal branch.

In a further embodiment of the method of the invention, a laser is provided which generates a beam having a pregiven frequency. The second frequency is different from the first frequency and is generated by an acousto-optical modulator which is mounted at a suitable location in a beam path.

A laser which can be modulated in frequency is provided in a further advantageous embodiment of the method of the invention. In this embodiment, the optical path is lengthened in one of the two beam paths in order to obtain a phase signal which can be evaluated. A semiconductor laser is especially suitable as a laser which can be modulated.

The method of the invention can be realized in an especially simple manner if the measuring assembly is realized in the form of integrated optics for which fiber-optical components can also be used.

Further details and advantageous embodiments of the method of the invention become evident from additional dependent claims in combination with the following description.

BRIEF DESCRIPTION OF THE DRAWINGS

The invention will now be explained with reference to the drawings wherein.

DESCRIPTION OF THE PREFERRED EMBODIMENTS OF THE INVENTION

Figure 1:
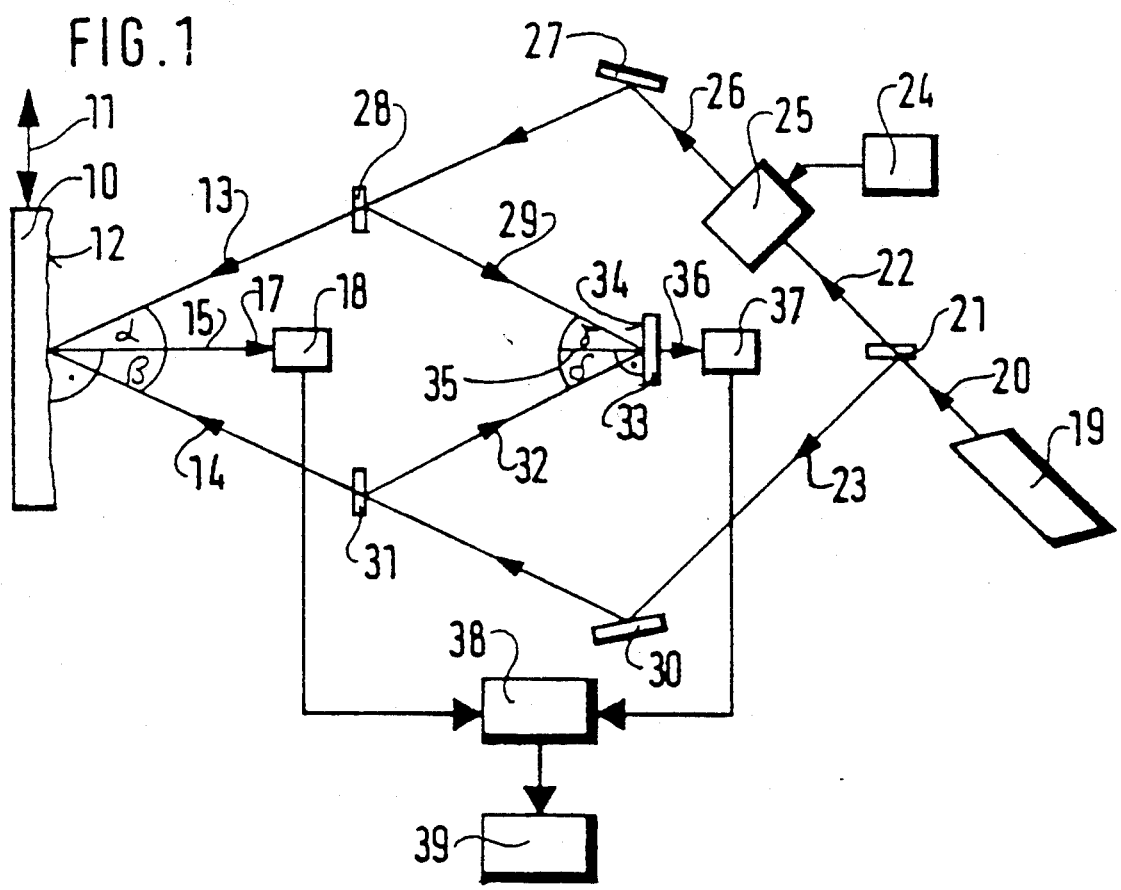
FIG. 1 is a schematic of a first embodiment of an arrangement for carrying out the method of the invention.

FIG. 1 shows an object 10 to be measured which is movable in the indicated direction 11. First and second optical beams (13, 14) are directed onto the surface 12 of the object. The beams define respective angles of incidence ($\alpha$ and $\beta$) with the vertical 15 erected on the surface 12. The two incident angles ($\alpha$ and $\beta$) are, for example, disposed on respective sides of the vertical 15. A beam 17 diffracted at the surface 12 of the object 10 to be measured lies, for example, parallel to the vertical 15 and impinges upon a first beam sensor 18. In this special case, the sight axis of the sensor 18 is arranged parallel to the vertical 15.

The two beams (13, 14) are derived from a laser 19 having a beam 20 split into first and second component beams (22, 23) by a beam splitter 21. The first component beam 22 reaches an acousto-optical modulator 25 controlled by a generator 24. The beam 26 leaving the modulator 25 has a phase modulation compared to the second component beam 23. The phase modulation includes also the special case of a phase-modulation period duration extending toward infinity so that the beams (23, 26) have different frequencies. After a reflection at a deflecting mirror 27, the beam 26 impinges on a beam splitter 28 from which the first beam 13 and a first reference beam 29 emanate. After the reflection at a deflecting mirror 30, the second component beam 23 likewise incidents upon a beam splitter 31 from which the second beam 14 and a second reference beam 32 emanate.

The first reference beam 29 impinges at an angle $\gamma$ and the second reference beam 32 impinges at an angle $\delta$ on a ground glass screen 33. The angles ($\gamma$ and $\delta$) are referred to a vertical 35 erected on the surface 34 of the screen 33. The transmitted beam 36 is diffracted at the screen 33 and is, for example, parallel to the vertical 35. The beam 36 reaches a further beam sensor 37. In this special case, the sight axis of the sensor 37 is aligned parallel to the vertical 35.

The output signals of the first and second beam sensor (18, 37) are supplied to a phase comparator 38 which emits an output signal to a counter 39.

The method of the invention is explained in greater detail with respect to the arrangement of FIG. 1. The surface 12 of the part 10 to be measured always has a certain roughness which acts as a grating for the optical beam provided the size of the microscopic surface structure is greater or at least equal to the wavelength of the beam. This precondition is fulfilled by all surfaces which can be technically produced. The first beam impinges on the surface 12 at an angle and is diffracted on the surface 12 at a pregiven frequency and reaches the first sensor 18. It can be presupposed that the surface 12 has structural portions having dimensions greater than that of the wavelength of the first beam 13. For this reason, many orders of diffraction occur. In each case, the diffracted beam 17 has an order not equal to zero. A movement of the object 10 in the indicated direction 11 changes the phase position of the diffracted beam 17 which is received by the first sensor 18. A displacement of the object 10 leads to a phase change. A displacement by a wavelength leads, for example, to a phase change of 360° for pregiven angles ($\alpha$ and $\beta$). A special advantage of the arrangement is that the distance between the surface 12 and the first sensor 18 is constant. The velocities of the object 10 as well as the traversed path can be evaluated. In lieu of the planar object 10 shown in FIG. 1, an object having a curved surface 12 can also be measured. One such object is, for example, a circularly-shaped disc having an angular position and/or angular velocity which can be determined.

The phase shift of the diffracted beam 17 can be determined from a comparison with a reference phase. For this reason, and in addition to the first beam 13, a first reference beam 29 is derived from the beam 26 by means of the beam splitter 28. The first reference beam 29 impinges at an angle $\gamma$ on the screen 33 in which a diffraction takes place. The diffracted beam 36, which does not correspond to the zero order, reaches the further sensor 37. The further sensor 37 makes a reference signal available at its output.

With the arrangement described above, a phase comparison is not yet possible because the frequency of the beams (13, 29) must be directly processed by the two sensors (18, 37) as well as by the phase comparator 38. For this reason, the diffracted beams (17, 36) are superposed with a second beam 14 and with a second reference beam 32, respectively, and interfere. These two beams are derived from the second component beam 23 having a frequency which differs from the frequency of beam 26. The frequency difference of the two beams (26, 23) is effected, for example, by an acousto-optical modulator 25 which is controlled by a generator 24. The generator 24 generates an adequately low frequency which can be processed without difficulty by the beam sensors (18, 37) and by the phase comparator 38. The acousto-optical modulator 25 can be arranged also in the beam path of the second component beam 23.

The second beam 14 is directed at an angle $\beta$ onto the surface 12 of the object 10 to be measured. At least part of the first and of the second beams (13, 14) have the same point of impingement on the surface 12 so that an interference of the two beams can take place. The diffracted beam 17, which does not correspond to zero order, is accordingly formed from the superposition of the diffracted first and second beams (13, 14).

The second reference beam 32 impinges at an angle δ on the surface 34 of the screen 33 wherein this beam is diffracted. The diffracted beam 36 is received by a further sensor 37 and is thereby a superposition of the diffracted component beams of the first and second reference beams (29, 32).

The signals emitted by sensors (18, 37) have a frequency corresponding to the difference of the frequencies of the optical beams (23, 26) and the frequency of the generator 24, respectively. Both signals are, for example, sinusoidal and have a phase difference which is linearly dependent upon the displacement of the object 10. For the phase difference Δφ, the following applies:

$$\Delta\phi = \frac{2\pi}{\lambda} \cdot \Delta L \cdot (\sin\alpha + \sin\beta)$$

wherein λ is the wavelength of the beam 23 and ΔL is the displacement of the object 10.

The phase comparator 38 supplies an output signal which is proportional to a displacement of the object 10 in the one direction or in the other direction. Multiples of a phase displacement of 360° are, for example, determined by the counter 39 wherein also a conversion into distance and/or angle units can be made.

An advantageous symmetrical configuration results if at least the incidence angle (α, −β) and/or the angles γ and −δ are each the same Complete symmetry is obtained if the magnitudes of all angles are the same. The advantage is that the optical distances which are subjected to environmental influences are all the same length so that the beam superposition and the subsequent difference formation of the output signals of the sensors (18, 37) substantially compensate the error influences.

Figure 2:
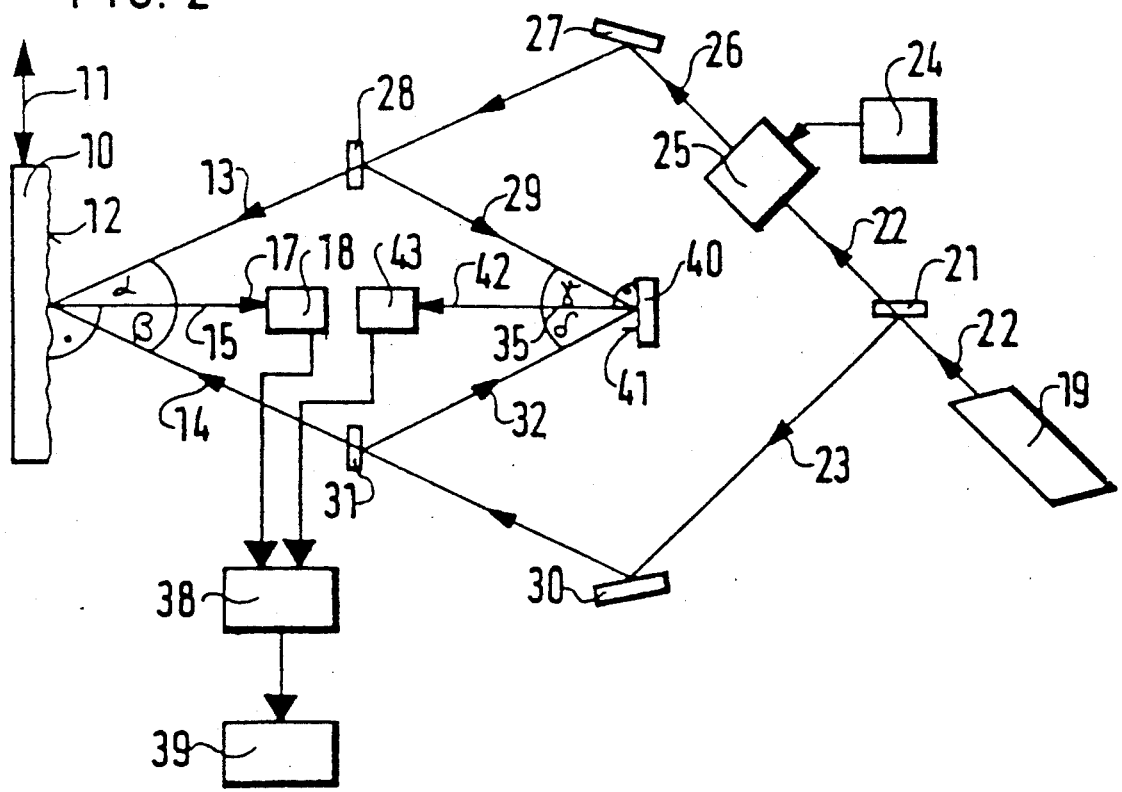
FIG. 2 is a schematic of a second embodiment of an arrangement for carrying out the method of the invention with this arrangement having a reference signal branch configured differently from that of the arrangement shown in FIG. 1.

FIG. 2 shows a second embodiment of an arrangement for carrying out the method of the invention. Those parts which correspond to the parts shown in FIG. 1 have the same numerals in FIG. 2 as in FIG. 1. The essential difference in the arrangement shown in FIG. 2 lies in the different configuration of the reference signal branch which, in FIG. 1, essentially includes the two reference beams (29, 32), the screen 33 as well as the further sensor 37. A reference object 40 is arranged in lieu of the screen 33. The two reference beams (29, 32) are directed to the same impingement point in the surface 41 of the reference object 40. The two reference beams (29, 32) are diffracted at the point of infringement and are superposed to diffracted reference beam 42 which is received by a further sensor 43. The sensor 43 corresponds to the sensor 37 in FIG. 1. The advantage of the arrangement shown in FIG. 2 compared to that shown in FIG. 1 lies essentially in that the arrangement is configured so as to be completely symmetrical. This applies especially then when the surface 41 of the reference object 40 has a surface structure similar to the surface 12 of the object 10 to be measured and the angles α, −β, γ and −δ are all the same and when the distance between the surface 12 and the first sensor 18 is equal to the distance between the surface 41 and the further sensor 43. The increase of the symmetry of the arrangement further reduces the environmental influences on the measuring result.

Figure 3:
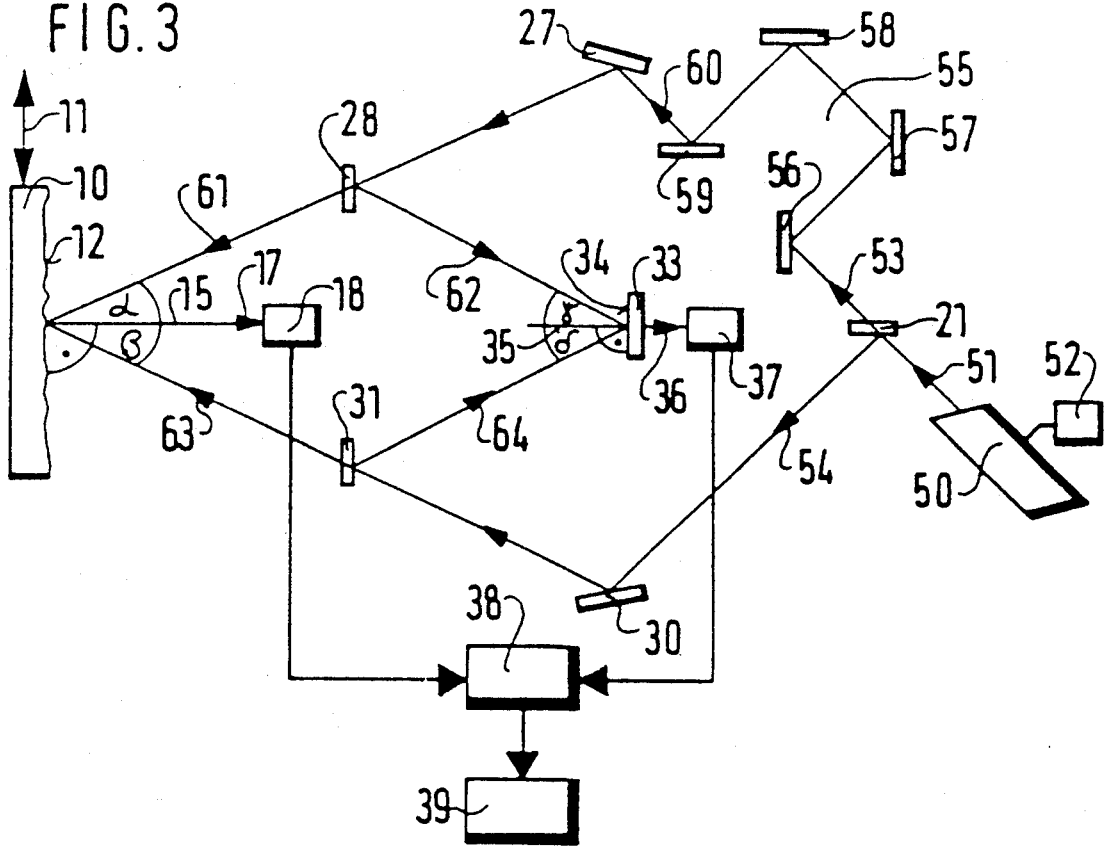
FIG. 3 is a schematic of a third embodiment of an arrangement for carrying out the method of the invention with this arrangement having a modulatable laser for supplying a beam having a frequency changeable by a generator connected to the laser; and, FIG. 4 is schematic of a fourth embodiment of an arrangement for carrying out the method of the invention wherein the beam supplied by the laser is guided in a light conductor including an integrated beam splitter.

In FIG. 3, a further embodiment is provided of the arrangement shown in FIG. 1 for carrying out the method of the invention. Those parts of FIG. 3 which correspond to those shown in FIG. 1 have the same reference numerals. The essential difference of the arrangement shown in FIG. 3 compared to that shown in FIG. 1 lies in the different configuration for generating the different frequencies of the first and second beams (13, 14). In lieu of the laser 19 shown in FIG. 1, which supplies a substantially monochromatic beam 20, a modulatable laser 50 is provided which supplies a beam 51 having a frequency which is changeable by a generator 52. The two component beams (53, 54) have the same frequency which changes as a function of time. The first component beam 53 reaches an optical detour 55 which, for example, is realized with four deflecting mirrors 56 to 59. The beam 60 leaving the optical detour 55 has a phase shift with respect to the second component beam 54 whose magnitude is dependent upon the frequency change of the beam 51 supplied by the laser 50. The beam 60 is split by beam splitter 28 into a first incident beam 61 and into a first reference beam 62. The second component beam 54 is split by beam splitter 31 into a second incident beam 63 and into a second reference beam 64. In contrast to the beams (13, 14) shown in FIGS. 1 and 2 and the reference beams (29, 32), the beams (61, 63) shown in FIG. 3 and the reference beams (62, 64) have the same frequency which changes as a function of time. The time-dependent phase shift caused by the optical detour 55 causes the two sensors (18, 37) to emit output signals which correspond to this phase shift changing as a function of time. When the object 10 is at rest, the additional difference of the phase position of the output signals of the sensors (18, 37) is zero with the phase position being determined by the phase comparator 38. A movement of the object 10 to be measured leads, in the manner already described, to a measurable additional phase difference which is converted into a distance indication or into an angular indication.

Figure 4:
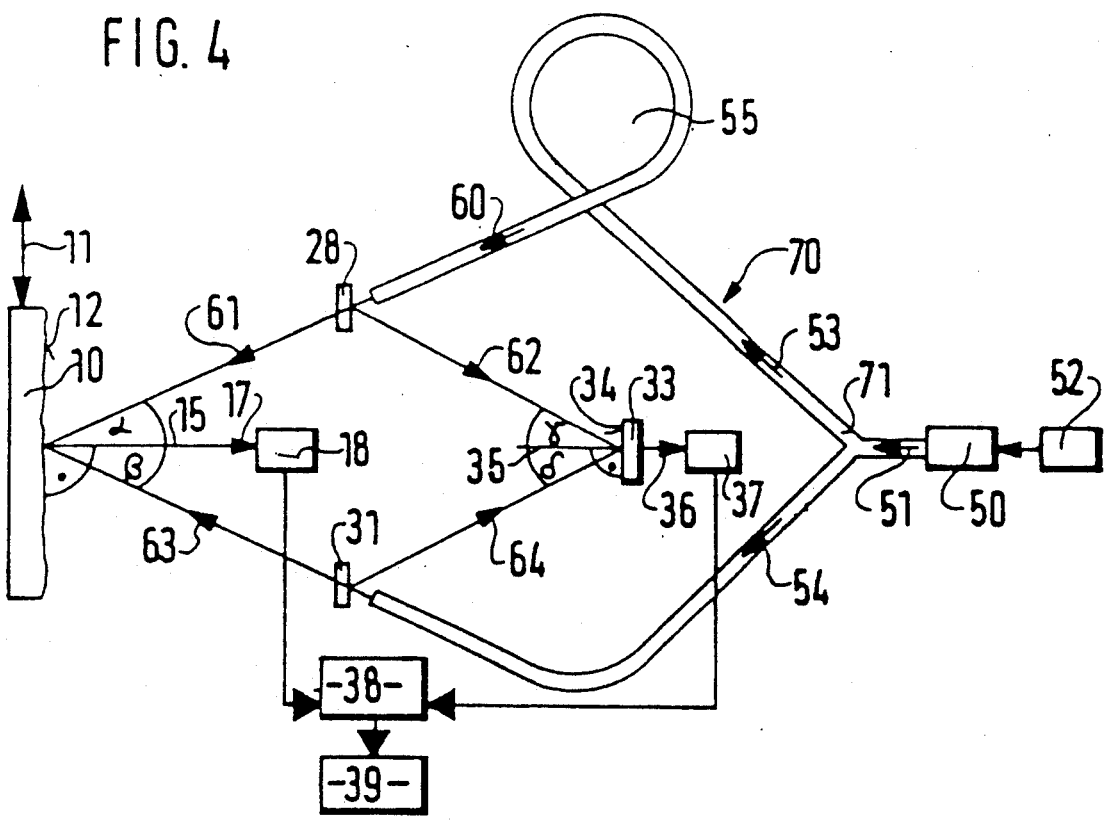

A further embodiment of the arrangement shown in FIG. 3 is provided in FIG. 4. Those parts which correspond to the parts given in FIG. 3 have the same reference numeral in FIG. 4 as they do in FIG. 3. The beam 51 supplied by laser 50 is guided in a light conductor 70. The light conductor 70 includes an integrated beam splitter 71 which splits the beam 51 coming from the laser into two component beams (53, 54). The optical detour 55 is, for example, realized as an optical guide loop. The beam guidance in the optical guide 70 terminates at the beam splitters (28, 31). In a further embodiment of the arrangement, it is possible to realize also the remaining assembly with optical guides and integrated optics. The advantage of the integrated optics wherein the beam is conducted in an optical guide is seen primarily in the possibility of miniaturizing the entire arrangement. In addition, with the guidance of the beam in the optical guide 70, one is no longer dependent upon the linear dissipation of the optical radiation in a medium having a homogeneous optical index of refraction such as air.

The optical assembly shown in FIG. 4 having the optical guide 70 is also usable in the arrangements shown in FIGS. 1 to 3. In addition, the completely symmetrical arrangement shown in FIG. 2 is also usable in the arrangements suggested in FIGS. 3 and 4 with the disc 33 being replaced by the reference object 40.

We claim:

1. A method of optoelectronically measuring distances and/or angles, the method comprising the steps of:

generating a laser beam having a frequency which can be modulated by a generator;

forming first and second beams from said laser beam;
passing said first beam through an optical detour for shifting said first beam in phase with respect to said second beam;
directing said first beam at a pregiven incident angle ($\alpha$) onto an object to be measured;
directing said second beam, which has a phase modulation with respect to the first beam, onto the object to be measured at a pregiven angle ($\beta$) of incidence with at least components of said first and second beams having the same point of incidence on the surface of said object;
detecting a beam, which is diffracted and interfered at said point of incidence, with a first beam sensor with the spacing between said object and sensor being at least approximately constant; and,
evaluating a phase change of the sensor output signal with respect to the phase of a reference signal as a measure for the traversed distance or the angle position of said object.

2. The method of claim 1, wherein the incident angle ($\alpha$) is equal to the negative incident angle ($\beta$).

3. The method of claim 2, wherein the angles ($\alpha$, $\beta$) lie on mutually opposite sides of a vertical erected on the surface of the object; and, the sight axis of the first sensor is aligned parallel to the vertical.

4. The method of claim 1, wherein the reference signal is derived from a first reference beam and a second reference beam, which are directed onto a further beam sensor having an output signal used as a reference signal.

5. The method of claim 4, wherein the two reference beams are directed onto a ground glass disc at respective pregiven angles ($\gamma$ and $\delta$); at least components of the two reference beams have the same incident point on the surface of the ground glass disc; and, the beam, which is diffracted by the ground glass disc and interfered, is received by the further sensor.

6. The method of claim 5, wherein the incident angle ($\gamma$) is equal to the negative incident angle ($\delta$).

7. The method of claim 6, wherein the angles ($\gamma$, $\delta$) lie on mutually opposite sides of a vertical erected on the surface of a ground glass disc; and, the sight axis of the further sensor is aligned parallel to the vertical.

8. The method of claim 7, wherein the angles ($\alpha$, $-\beta$, $\gamma$ and $-\delta$) are equal.

9. The method of claim 4, wherein the two reference beams are directed onto the surface of a reference object; at least components of the reference beams have the same point of incidence on the surface of the reference object; and, the radiation, which is diffracted at the point of incidence and interfered, is detected by a further beam sensor with the first and second optical beams, the first and second reference beams as well as the beam, which is diffracted on the surface of the object to be measured, and the beam, which is diffracted on the surface of the reference object, traverse the same optical paths up to impingement on the sensors, respectively.

10. The method of claim 1, wherein a semiconductor laser is used.

11. The method of claim 1, wherein at least components of the beams are guided in an optical guide.

12. The method of claim 1, wherein at least components of the optical components are integrated optical components.

13. The method of claim 1, wherein said laser beam is monochromatic.

* * * * *

UNITED STATES PATENT AND TRADEMARK OFFICE
CERTIFICATE OF CORRECTION

PATENT NO. : 5,141,317

DATED : August 25, 1992

INVENTOR(S) : Heins-Erdam Bollhagen and Pawel Drabarek

It is certified that error appears in the above-identified patent and that said Letters Patent is hereby corrected as shown below:

On the Title page,

In the title page, under item [22]: delete "PCT Filed: Jun. 22, 1988" and substitute therefor -- PCT Filed: Jun. 22, 1989 --.

In the title page, under "Other Publications", line 2: delete "Dimenstional" and substitute -- Dimensional -- therefor.

In column 5, line 28: between "same" and "Complete", insert -- . --.

Signed and Sealed this

Nineteenth Day of October, 1993

Attest:

BRUCE LEHMAN

Attesting Officer

Commissioner of Patents and Trademarks